United States Patent
Finnigan

(10) Patent No.: US 7,976,245 B2
(45) Date of Patent: Jul. 12, 2011

(54) MOORING

(75) Inventor: Timothy Donegal Finnigan, Waverley (AU)

(73) Assignee: Sykei Pty. Ltd., Waverley (AU)

( * ) Notice: Subject to any disclaimer, the term of this patent is extended or adjusted under 35 U.S.C. 154(b) by 536 days.

(21) Appl. No.: 12/063,399

(22) PCT Filed: Aug. 11, 2006

(86) PCT No.: PCT/AU2006/001150
§ 371 (c)(1),
(2), (4) Date: May 16, 2008

(87) PCT Pub. No.: WO2007/019609
PCT Pub. Date: Feb. 22, 2007

(65) Prior Publication Data
US 2010/0135729 A1 Jun. 3, 2010

(30) Foreign Application Priority Data

Aug. 12, 2005 (AU) .................. 2005904355
Jul. 26, 2006 (AU) .................. 2006904030

(51) Int. Cl.
*E02D 5/74* (2006.01)
(52) U.S. Cl. .. 405/224; 405/223.1; 405/75; 114/230.13; 114/230.26

(58) Field of Classification Search ............... 405/223.1, 405/224, 75, 76; 166/338, 340, 341, 342, 166/343, 351, 360; 114/293, 294, 295, 230.13, 114/230.26
See application file for complete search history.

(56) References Cited

U.S. PATENT DOCUMENTS

| 4,459,931 A * | 7/1984 | Glidden ................. 114/230.1 |
| 5,791,823 A * | 8/1998 | Blakley et al. ........... 405/259.1 |
| 6,409,428 B1 * | 6/2002 | Moog ..................... 405/169 |
| 2005/0147471 A1* | 7/2005 | Lee et al. ................. 405/75 |
| 2006/0177274 A1* | 8/2006 | O'Sullivan ............... 405/224 |

* cited by examiner

Primary Examiner — David J Bagnell
Assistant Examiner — Sean Andrish
(74) Attorney, Agent, or Firm — MBHB LLP

(57) ABSTRACT

A mooring (10) for connecting an ocean energy capturing device (51) to a seabed (16) is disclosed. The mooring (10) comprises a base (12) adapted for connection to the ocean energy capturing device (51). A plurality of anchor bolts (18) are each connected at a first end to the base (12) and have a second end adapted to be embedded in the seabed (16) for attaching the base (12) to the seabed (16). A method of securing the ocean energy capturing device (51) to the seabed (16) is also disclosed. The method involves passing a tensile transmission line (46) through a guide opening (44) in the base (12) and drawing the tensile transmission line (46) through the guide opening (44) to drag the ocean energy capturing device (51) toward the base (51).

15 Claims, 3 Drawing Sheets

MOORING

TECHNICAL FIELD

The present invention relates generally to moorings, and in particular, to a mooring for anchoring an ocean energy capturing device to the seabed.

The present invention has been developed primarily for use in the field of hydro-electricity generation, and will be described hereinafter with reference to this particular application. However, it will be appreciated that the invention may also be used for mooring offshore wind turbines, subsea pipelines, and other structures, either offshore or on land.

BACKGROUND OF THE INVENTION

Known moorings for ocean energy capturing devices include large fixed gravity bases, clump or drag anchors, and pile moorings.

A disadvantage of known moorings is that they have limited application across varied water depths, seabed materials and bathymetric conditions. Another disadvantage of known moorings is that they occupy a large area, and also do not provide adequate resistance to both lateral and rotational forces in all conditions. Many known moorings also require substantial seabed preparation and levelling prior to installation.

Another disadvantage of known moorings is that they are large and unwieldy, making them difficult to deploy and install. Known moorings often require special large-bore drilling rigs to create a socket in the seabed, in which a large-diameter monopole is inserted. This known method of installation is very expensive.

A further disadvantage of known moorings is that their large size and complexity makes them prohibitively expensive.

OBJECT OF THE INVENTION

It is the object of the present invention to substantially overcome, or at least ameliorate, one or more of the above disadvantages.

SUMMARY OF THE INVENTION

Accordingly, in a first aspect, the present invention provides a mooring for connecting an ocean energy capturing device to a seabed, said mooring comprising:
  a base adapted for connection to the ocean energy capturing device; and
  a plurality of anchor bolts, each having a first end and a second end, to be embedded in the seabed and connected to the base for attaching the base to the seabed.

Preferably, the base has a generally planar mounting surface.

Preferably, the anchor bolts are connected at the first end to the base by lock nuts. The second end of the anchor bolts is preferably adapted to be embedded in the seabed by one of: drilling and grouting, screwing and locking by expansion, or direct driving. A spherical joint is preferably provided between the lock nuts and the base. In some embodiments, the anchor bolts extend in a direction generally perpendicular to the plane of the base, and in other embodiments, at least some of the anchor bolts are offset from said perpendicular direction.

Preferably, a plurality of legs extend from the base for engagement with the seabed to distribute loads from the base to the seabed. More preferably, at least one of the legs is adjustable to allow for adjustment of the orientation of the base relative to the seabed. Preferably, the base includes a generally planar mounting surface which is adapted for positioning substantially parallel with the plane of the seabed. A pad is preferably connected to a seabed engaging end of each of the legs for distributing loads transferred to the seabed through the legs. More preferably, the pad is tailored to the prevailing seabed conditions.

In an alternative embodiment, an apron extends from the base for engagement with the seabed to distribute loads from the base to the seabed. Preferably, the apron has a peripheral lip extending in a direction substantially normal to the plane of the base. The apron is preferably substantially circular. In a preferred form, a rubble rim is formed around the apron.

In another alternative embodiment, the base forms the top of a suction caisson and is secured to the seabed by a vacuum pressure.

Preferably, the base includes a socket engageable by the ocean energy capturing device for connecting the ocean energy capturing device to the base. The socket is preferably tapered, with a larger diameter end of the socket being at the end furthest from the base. The socket is preferably adapted for engagement with a complimentary spigot on the ocean energy capturing device. The socket is preferably of non-circular cross section to provide for automatic alignment with the spigot.

Preferably, the socket is provided in a generally cylindrical boss located substantially centrally on the base. A plurality of circumferentially spaced buttress supports preferably extend between a radially outer periphery of the boss and the base. An annular flange preferably extends radially outwardly from an open end of the socket. Preferably, the annular flange includes apertures for receiving fasteners for connecting the ocean energy capturing device to the base. The guide opening is preferably provided in the radially outer periphery of the boss.

Preferably, a first pulley wheel is connected to the base. More preferably, the first pulley wheel is located adjacent the end of the socket closest the base. A second pulley wheel is preferably located adjacent the guide opening.

In a second aspect, the present invention provides a mooring for connecting an ocean energy capturing device to the seabed, said mooring comprising:
  a base adapted for stationary mounting to a seabed and for connection to the ocean energy capturing device;
  a guide opening in the base, the guide opening adapted to receive a tensile transmission line therethrough for guiding the ocean energy capturing device toward the base for engagement therewith.

Preferably, the base has a generally planar mounting surface.

Preferably, a plurality of anchor bolts to be embedded in the seabed are connected to the base for attaching the base to the seabed. A first end of each of the anchor bolts is preferably connected to the base by lock nuts. A second end of each of the anchor bolts is preferably adapted to be embedded in the seabed by one of: drilling and grouting, screwing and locking by expansion, or direct driving. In some embodiments, the anchor bolts extend in a direction generally perpendicular to the plane of the base, and in other embodiments, the anchor bolts are offset from said perpendicular direction. A spherical joint is preferably provided between the lock nuts and the base.

Preferably, a plurality of legs extend from the base for engagement with the seabed to distribute loads from the base to the seabed. More preferably, at least one of the legs is adjustable to allow for adjustment of the orientation of the base relative to the seabed. Preferably, the base includes a generally planar mounting surface which is adapted for positioning substantially parallel with the plane of the seabed. A pad is preferably connected to a seabed engaging end of each of the legs for distributing loads transferred to the seabed through the legs. More preferably, the pad is tailored to the prevailing seabed conditions.

In an alternative embodiment, an apron extends from the base for engagement with the seabed to distribute loads from the base to the seabed. Preferably, the apron has a peripheral lip extending in a direction substantially normal to the plane of the base. The apron is preferably substantially circular. More preferably, a rubble rim is formed around the apron.

In another alternative embodiment, the base forms the top of a suction caisson and is secured to the seabed by a vacuum pressure.

Preferably, the base includes a socket engageable by the ocean energy capturing device for connecting the ocean energy capturing device to the base. The socket is preferably tapered, with a larger diameter end of the socket being at the end furthest from the base. The socket is preferably adapted for engagement with a complimentary spigot on the ocean energy capturing device. The socket is preferably of non-circular cross section to provide for automatic alignment with the spigot.

Preferably, the socket is provided in a generally cylindrical boss located substantially centrally on the base. A plurality of circumferentially spaced buttress supports preferably extend between a radially outer periphery of the boss and the base. An annular flange preferably extends radially outwardly from an open end of the socket. Preferably, the annular flange includes apertures for receiving fasteners for connecting the ocean energy capturing device to the base. The guide opening is preferably provided in the radially outer periphery of the boss.

Preferably, a first pulley wheel is connected to the base. More preferably, the first pulley wheel is located adjacent the end of the socket closest the base. A second pulley wheel is preferably located adjacent the guide opening.

In a third aspect, the present invention provides a mooring for connecting an ocean energy capturing device to the seabed, said mooring comprising:
a base adapted for stationary mounting to a seabed, the base including a tapered socket adapted for engagement with a complimentary spigot on the ocean energy capturing device to connect the ocean energy capturing device to the base.

A larger diameter end of the socket is preferably located at its end furthest from the base. The socket is preferably of non-circular cross section to provide for automatic alignment with the spigot.

Preferably, a plurality of anchor bolts to be embedded in the seabed are connected to the base for attaching the base to the seabed. A first end of each of the anchor bolts is preferably connected to the base by lock nuts. A second end of each of the anchor bolts is preferably adapted to be embedded in the seabed by one of: drilling and grouting, screwing and locking by expansion, or direct driving. In some embodiments, the anchor bolts extend in a direction generally perpendicular to the plane of the base, and in other embodiments, the anchor bolts are offset from said perpendicular direction. A spherical joint is preferably provided between the lock nuts and the base.

Preferably, the base has a generally planar mounting surface.

Preferably, a plurality of legs extend from the base for engagement with the seabed to distribute loads from the base to the seabed. More preferably, at least one of the legs is adjustable to allow for adjustment of the orientation of the base relative to the seabed. Preferably, the base includes a generally planar mounting surface which is adapted for positioning substantially parallel with the plane of the seabed. A pad is preferably connected to a seabed engaging end of each of the legs for distributing loads transferred to the seabed through the legs. More preferably, the pad is tailored to the prevailing seabed conditions.

In an alternative embodiment, an apron extends from the base for engagement with the seabed to distribute loads from the base to the seabed. Preferably, the apron has a peripheral lip extending in a direction substantially normal to the plane of the base. The apron is preferably substantially circular. More preferably, a rubble rim is formed around the apron.

In another alternative embodiment, the base forms the top of a suction caisson and is secured to the seabed by a vacuum pressure.

Preferably, the socket is provided in a generally cylindrical boss located substantially centrally on the base. A plurality of circumferentially spaced buttress supports preferably extend between a radially outer periphery of the boss and the base. An annular flange preferably extends radially outwardly from an open end of the socket. Preferably, the annular flange includes apertures for receiving fasteners for connecting the ocean energy capturing device to the base. The guide opening is preferably provided in the radially outer periphery of the boss.

Preferably, a first pulley wheel is connected to the base. More preferably, the first pulley wheel is located adjacent the end of the socket closest the base. A second pulley wheel is preferably located adjacent the guide opening.

In a fourth aspect, the present invention provides a method of securing an ocean energy capturing device to a seabed, said method comprising the steps of:
providing a mooring comprising:
a base adapted for stationary mounting to the seabed and for connection to the ocean energy capturing device; and
a guide opening in the base, the guide opening adapted to receive a tensile transmission line therethrough for guiding the ocean energy capturing device toward the base for engagement therewith;
securing the base relative to the seabed;
connecting one end of the tensile transmission line to the ocean energy capturing device;
passing the tensile transmission line through the guide opening;
drawing the tensile transmission line through the guide opening to drag the ocean energy capturing device toward the base; and
connecting the ocean energy capturing device to the base.

Preferably, the base includes a tapered socket and the ocean energy capturing device is preferably provided with a complimentary tapered spigot engageable with the socket. A larger diameter end of the socket is preferably located at its end furthest from the base. More preferably, the socket and spigot are of non-circular cross section to provide for automatic alignment therebetween.

Preferably, a first pulley wheel is connected to the base. More preferably, the first pulley wheel is located adjacent an end of the socket closest the base. A second pulley wheel is preferably located adjacent the guide opening. Preferably, the tensile transmission line is passed around the first and second pulleys during said drawing.

In a fifth aspect, the present invention provides a mooring for connecting an ocean energy capturing device to a seabed, said mooring comprising:
- a base adapted for connection to the ocean energy capturing device;
- a guide opening in the base, the guide opening adapted to receive a tensile transmission line therethrough for guiding the ocean energy capturing device toward the base for engagement therewith; and
- a plurality of anchor bolts to be embedded in the seabed and connected to the base for attaching the base to the seabed.

In a sixth aspect, the present invention provides a mooring for connecting an ocean energy capturing device to a seabed, said mooring comprising:
- a base including a tapered socket adapted for engagement with a complimentary spigot on the ocean energy capturing device to connect the ocean energy capturing device to the base; and
- a plurality of anchor bolts to be embedded in the seabed and connected to the base for attaching the base to the seabed.

In a seventh aspect, the present invention provides a mooring for connecting an ocean energy capturing device to a seabed, said mooring comprising:
- a base adapted for stationary mounting to a seabed, the base including a tapered socket adapted for engagement with a complimentary spigot on the ocean energy capturing device to connect the ocean energy capturing device to the base; and
- a guide opening in the base, the guide opening adapted to receive a tensile transmission line therethrough for guiding the ocean energy capturing device toward the base for engagement therewith.

In an eighth aspect, the present invention provides a mooring for connecting an ocean energy capturing device to a seabed, said mooring comprising:
- a base including a tapered socket adapted for engagement with a complimentary spigot on the ocean energy capturing device to connect the ocean energy capturing device to the base;
- a guide opening in the base, the guide opening adapted to receive a tensile transmission line therethrough for guiding the ocean energy capturing device toward the base for engagement therewith; and
- a plurality of anchor bolts to be embedded in the seabed and connected to the base for attaching the base to the seabed.

BRIEF DESCRIPTION OF THE DRAWINGS

Preferred embodiments of the present invention will now be described, by way of examples only, with reference to the accompanying drawings wherein.

DETAILED DESCRIPTION OF THE PREFERRED EMBODIMENTS

Figure 1:
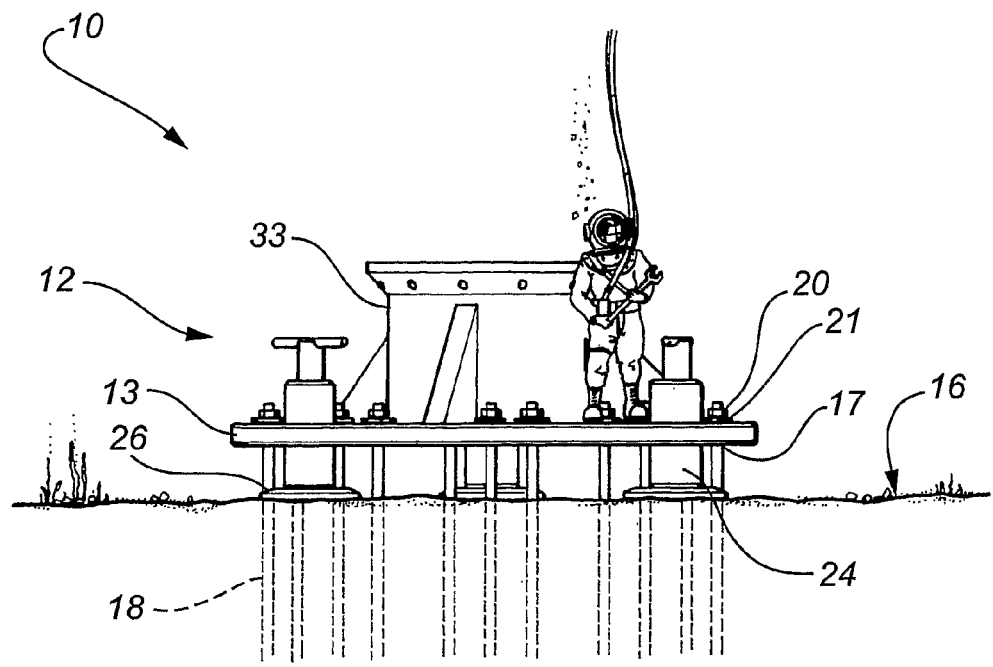
FIG. 1 is a schematic elevational view of a preferred embodiment of a mooring in accordance with the first aspect of the present invention.

As best shown in FIG. 1, the mooring 10 comprises a base 12 adapted for connection to an ocean energy capturing device (such as those disclosed in the Applicant's earlier filed Australian Provisional Patent Application Nos. 2006904031 and 2006904032 and the co-pending international patent applications claiming Convention priority therefrom, the disclosures of which are incorporated herein by reference). The base 12 includes a generally planar mounting surface 13 which is adapted for positioning substantially parallel with the seabed 16. The base 12 also includes mounting apertures 17 through which a plurality of anchor bolts 18 are installed. A first end of the anchor bolts 18 is adapted for connection to the base 12 by lock nuts 20, and a second end of the anchor bolts is adapted to be embedded in the seabed 16 for attaching the base 12 to the seabed 16. The anchor bolts 18 have a diameter substantially less than that of the mounting apertures 17 to compensate for minor misalignment of the anchor bolts 18 and mounting apertures 17. Washers 21 are provided between the base 12 and the lock nuts 20.

Figure 1A:
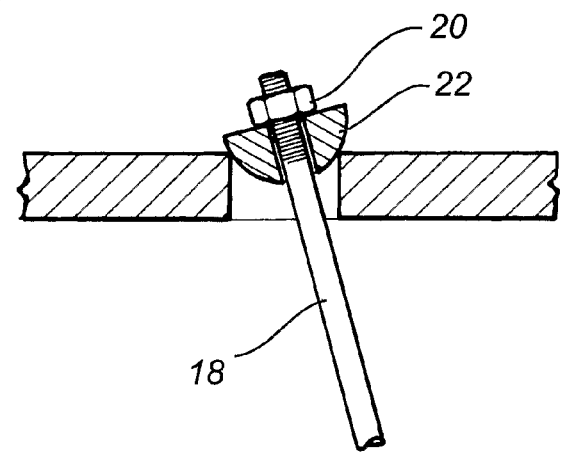
FIG. 1A is a schematic fragmentary elevational view of an alternate anchoring arrangement for the mooring of FIG. 1.

As shown in FIGS. 1 and 1A, depending on seabed conditions, the anchor bolts 18 can either be installed in a direction generally perpendicular to the plane of the base 12 (i.e. vertically), or can be offset from the perpendicular direction (i.e. inclined relative to vertical). A spherical joint 22 is provided between the lock nuts 20 and the base 12 to ensure that tension in the anchor bolts 18 is transferred vertically downwardly through the base 12 even if the anchor bolts 18 are inclined. The other end of the anchor bolts 18 is connected to the seabed 16 by drilling and grouting, screwing and locking by expansion, or direct driving.

Figure 1B:
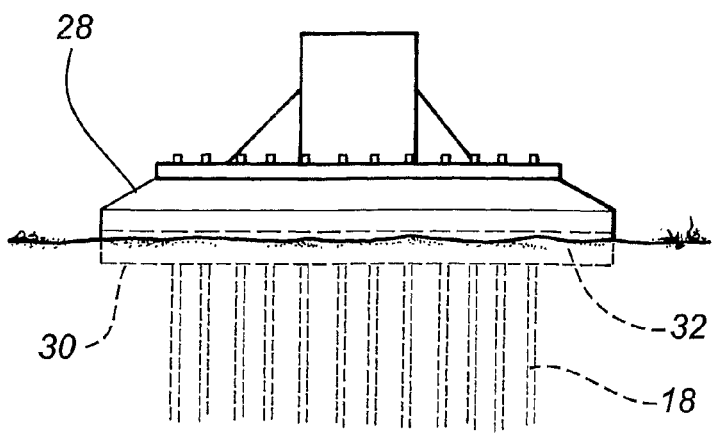
FIG. 1B is a schematic elevational view of an alternative embodiment of a mooring according to the second aspect of the present invention.
Figure 2:
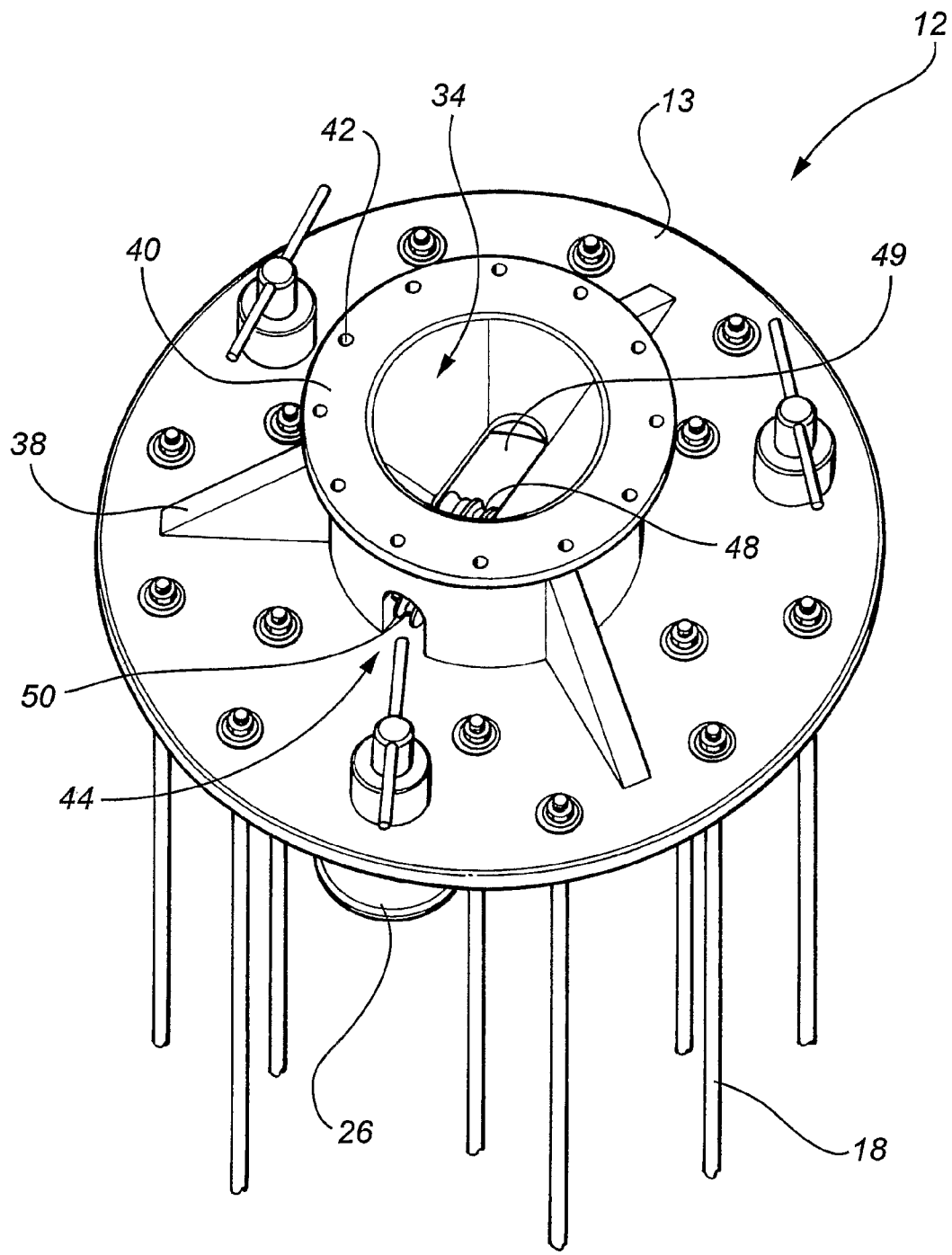
FIG. 2 is a schematic top perspective view of the mooring of FIG. 1.

In the embodiment shown in FIGS. 1, 1B and 2, three legs 24 extend from the base 12 for engagement with the seabed 16 to distribute loads from the base 12 to the seabed 16. The legs 24 are adjustable to allow for adjustment of the orientation of the base 12 relative to the seabed 16. A pad 26 is connected to a seabed engaging end of each of the legs 24 for distributing loads transferred to the seabed 16 through the legs 24. The characteristics of the pads 26 are tailored to the prevailing seabed conditions.

In the embodiment shown in FIG. 1B, the legs 24 are replaced by a substantially circular apron 28, which extends from the base 12 for engagement with the seabed 16 to distribute loads from the base 12 to the seabed 16. The apron 28 has a peripheral lip 30 extending in a direction substantially normal to the plane of the mounting surface 15 (i.e. vertically). A rubble rim 32 is formed around the apron 28 to protect the apron 28 against scour and erosion.

As best shown in FIG. 2, a generally cylindrical boss 33 extends substantially perpendicularly from the base 12. The boss 33 includes a socket 34 engageable by the ocean energy capturing device for connecting the ocean energy capturing device to the base 12. The socket 34 is tapered, with a larger diameter end of the socket being at the end furthest from the base 12. The socket 34 is also of non-circular cross section. The cylindrical boss 33 located substantially centrally on the base 12. A plurality of circumferentially spaced buttress supports 38 extend between a radially outer periphery of the boss 33 and the base 12 to strengthen the connection between the base 12 and the boss 33 against lateral forces exerted by the wave energy capturing device due to wave forces. An annular flange 40 extends radially outwardly from the open end of the socket 34 and includes apertures 42 for receiving fasteners (not shown) for connecting the ocean energy capturing device to the base 12.

A guide opening 44 is provided in the radially outer periphery of the boss 33. The guide opening 44 is adapted to receive a tensile transmission line, in the form of a cable 46, therethrough for guiding the ocean energy capturing device toward the base 12 for engagement with the socket 34.

A first pulley wheel 48 is connected to the base 12 adjacent an opening 49 in the lower end of the socket 34. A second pulley wheel 50 is located adjacent the guide opening 44.

Figure 3A:
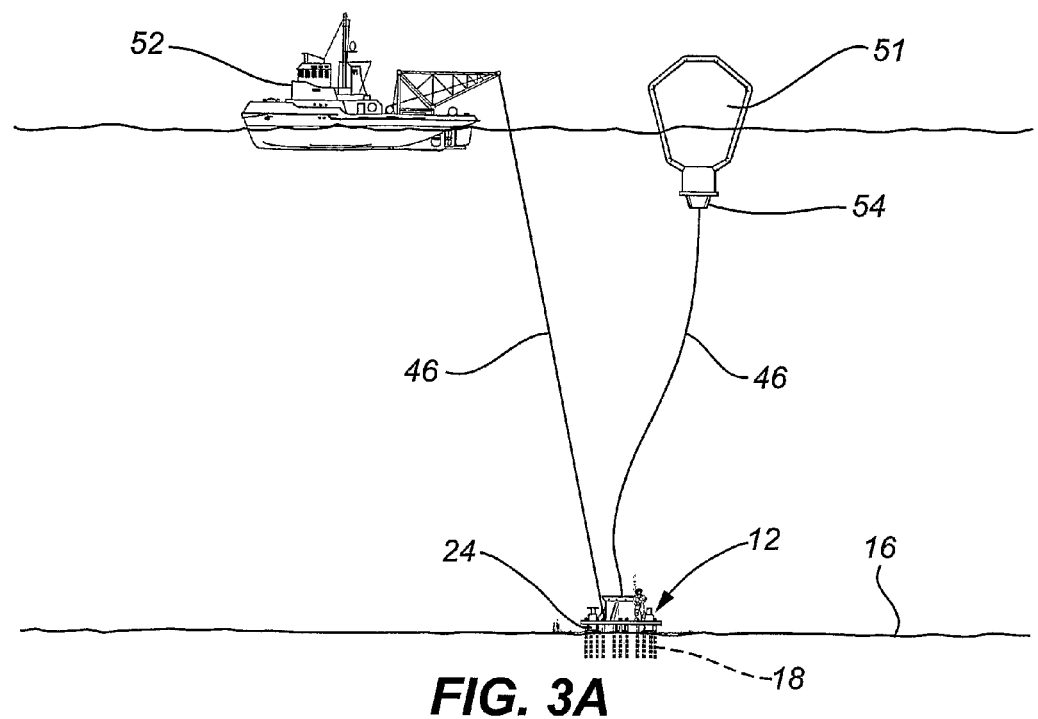
FIGS. 3A and 3B are schematic views showing a preferred method of connecting an energy capturing device to a mooring, according to the third aspect of the invention.
Figure 3B:
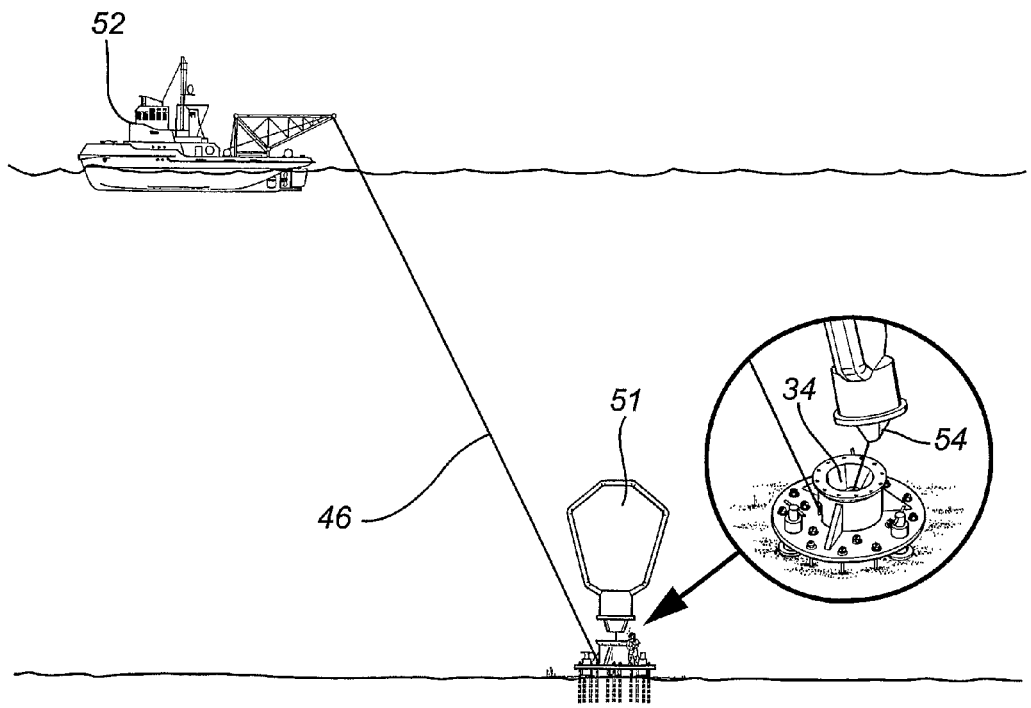

The process of connecting the ocean energy capturing device 51, which is buoyant, to the seabed 16 is shown schematically in FIGS. 3A and 3B. Firstly, the desired location on the seabed 16 is selected. The base 12 is then transported to this location and lowered into position, where it will rest under its own weight, even in moderate wave/current conditions. If required, the lengths of the legs 24 are adjusted to compensate for any unevenness in the seabed 16. The anchor bolts 18 are then connected to the seabed 16, through the mounting apertures 17 in the base 12, by drilling and grouting, screwing and locking by expansion, or direct driving. Lock nuts 20 are next screwed onto the upper ends of the anchor bolts 18 and tightened against the base 12 to apply a tension to the anchor bolts 18 to secure the base 12 to the seabed 16.

With the base 12 now securely connected to the seabed 16, the cable 46 is passed down through the centre of the socket 34, around the first 48 and second 50 pulley wheels, and through the guide opening 44. One end of the cable 46 is then connected to the ocean energy capturing device 51 and the other end to a tug boat 52. The boat 52 is then driven away from the base 12 to draw the cable through the guide opening 44 and drag the ocean energy capturing device 51 down onto the base 12 for connection thereto. The ocean energy capturing device 51 includes a tapered spigot 54, of non-circular cross section complimentary with that of the socket 34, for engagement with the conical socket 34. The non-circular cross sections of the socket and spigot facilitate the automatic alignment of the apertures 42 around the socket 34 with corresponding apertures (not shown) around the spigot 54. When the spigot 54 and socket 34 are engaged, a retaining mechanism (not shown) automatically engages to temporarily connect the ocean energy capturing device to the base until fasteners (not shown) are installed through the apertures 42 to fixedly connect the ocean energy capturing device 51 to the base 12. Once the fasteners (not shown) are installed, the cable is disconnected from the ocean energy capturing device.

It will be appreciated that the illustrated mooring advantageously has a relatively low environmental impact on the seabed due to the provision of the plurality of anchor bolts, which distribute loads applied to the seabed through the base. The configuration of the mooring also advantageously allows the base to have a relatively small footprint, which also reduces negative impacts on the seabed environment. The provision of the adjustable legs 24 also advantageously allows the mooring to be used in uneven seabed conditions. Also, the alternative configuration utilising the apron advantageously allows the mooring to be used in relatively soft or unstable seabed conditions. The provision of the conical socket also advantageously facilitates alignment and connection of an ocean energy capturing device with the base. The method for connecting the ocean energy capturing device to the seabed, as described above, is also relatively simple compared to conventional techniques.

While the invention has been described with reference to specific embodiments, it will be appreciated that it may also be embodied in many other forms. For example:

- The base 12 can form the top of a suction caisson and be secured to the seabed 16 by a vacuum pressure;
- The cable 46 can be drawn by a winch or crane instead of by a tug boat; and/or
- The mooring 10 can be used to moor offshore wind turbines, subsea pipelines, or other structures, either offshore or on land.

The invention claimed is:

1. A method of securing an ocean energy capturing device to a seabed, said method comprising the steps of:

providing a mooring comprising:
- a base adapted for stationary mounting to the seabed and for connection to the ocean energy capturing device;
- a tapered socket on the base, the socket being of non-circular cross-section; and
- a guide opening in the base, the guide opening adapted to receive a tensile transmission line therethrough for guiding the ocean energy capturing device toward the base for engagement therewith;

securing the base relative to the seabed;
connecting one end of the tensile transmission line to the ocean energy capturing device;
passing the tensile transmission line through the guide opening;
drawing the tensile transmission line through the guide opening to drag the ocean energy capturing device toward the base; and
connecting the ocean energy capturing device to the base by engaging a tapered spigot on the ocean energy capturing device with the tapered socket on the base.

2. A method according to claim 1, wherein a larger diameter end of the socket is located at an end of the socket furthest from the base.

3. A method according to claim 1, including the additional step of providing a first pulley wheel connected to the base.

4. A method according to claim 3, wherein the first pulley wheel is located adjacent an end of the socket closest the base.

5. A method according to claim 3, including the additional step of providing a second pulley wheel located adjacent the guide opening.

6. A method according to claim 5, including the additional step of passing the tensile transmission line around the first and second pulleys during said drawing.

7. A method according to claim 1, wherein the mooring comprises a plurality of legs extending from the base for engagement with the seabed to distribute loads from the base to the seabed.

8. A method according to claim 7, wherein at least one of the legs is adjustable to allow for adjustment of the orientation of the base relative to the seabed.

9. A method according to claim 7, further comprising a pad connected to a seabed engaging end of each of the legs for distributing the loads transferred to the seabed through the legs.

10. A method according to claim 1, wherein securing the base to the seabed comprises installing a plurality of anchor bolts, each having a first end for connection to the base and a second end for connection to the seabed.

11. A method according to claim 10, wherein said anchor bolts are connected to the base at said first end by lock nuts.

12. A method according to claim 11, further comprising a spherical joint between each of the lock nuts and the base.

13. A method according to claim 10, wherein said second end of said anchor bolts is adapted to be embedded in the seabed by drilling and grouting, screwing and locking by expansion, or direct driving.

14. A method according to claim 1, wherein the mooring comprises:
- an apron extending from the base for engagement with the seabed to distribute loads from the base to the seabed; and
- a rubble rim formed around the apron.

15. A method according to claim 1, further comprising an annular flange extending radially outwardly from an open end of the socket.

* * * * *